(12) United States Patent
Kempanna et al.

(10) Patent No.: US 11,477,274 B2
(45) Date of Patent: Oct. 18, 2022

(54) CAPABILITY-AWARE SERVICE REQUEST DISTRIBUTION TO LOAD BALANCERS

(71) Applicant: VMware, Inc., Palo Alto, CA (US)

(72) Inventors: Raghav Kempanna, Bengaluru (IN); Sreeram Iyer, Bengaluru (IN); Prasad Rao, Bengaluru (IN); Rajagopal Sreenivasan, Bengaluru (IN); Sudarshana Kandachar Sridhara Rao, Bengaluru (IN); Rakesh Kumar R, Bengaluru (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

(21) Appl. No.: 17/142,248

(22) Filed: Jan. 6, 2021

(65) Prior Publication Data

US 2022/0217202 A1 Jul. 7, 2022

(51) Int. Cl.
*H04L 67/1008* (2022.01)
*H04L 45/12* (2022.01)
*H04L 41/0806* (2022.01)
*H04L 67/1034* (2022.01)
*H04L 67/101* (2022.01)
*H04L 67/63* (2022.01)

(52) U.S. Cl.
CPC ...... *H04L 67/1008* (2013.01); *H04L 41/0806* (2013.01); *H04L 45/123* (2013.01); *H04L 67/101* (2013.01); *H04L 67/1034* (2013.01); *H04L 67/63* (2022.05)

(58) Field of Classification Search
CPC ............. H04L 67/1008; H04L 67/1004; H04L 67/1012; H04L 67/101; H04L 67/1034; H04L 67/327; H04L 41/0806; H04L 45/123
See application file for complete search history.

(56) References Cited

U.S. PATENT DOCUMENTS

2015/0358236 A1* 12/2015 Roach ................. H04L 41/0896 370/235

\* cited by examiner

*Primary Examiner* — Ryan J Jakovac
(74) *Attorney, Agent, or Firm* — SU IP Consulting (57) ABSTRACT

Example methods and systems for capability-aware service request distribution are described. In one example, a network element may obtain a set of capability information associated with multiple load balancers capable of service request handling and identify varying capability levels among the multiple load balancers. The network element may assign unequal path cost information to the multiple load balancers to indicate the varying capability levels. The unequal path cost information may include (a) a first path cost that is assigned to the first load balancer; and (b) a second path cost that is assigned to the second load balancer and different to the first path cost to indicate the lower capability level of the second load balancer compared to the first load balancer. In response to detecting a service request, the service request may be steered towards one of the multiple load balancers based on the unequal path cost information.

21 Claims, 7 Drawing Sheets

CAPABILITY-AWARE SERVICE REQUEST DISTRIBUTION TO LOAD BALANCERS

BACKGROUND

Virtualization allows the abstraction and pooling of hardware resources to support virtual machines in a software-defined network (SDN) environment, such as a software-defined data center (SDDC). For example, through server virtualization, virtualized computing instances such as virtual machines (VMs) running different operating systems may be supported by the same physical machine (e.g., referred to as a "host"). Each VM is generally provisioned with virtual resources to run a guest operating system and applications. The virtual resources may include central processing unit (CPU) resources, memory resources, storage resources, network resources, etc. In practice, a load balancer may be deployed to steer incoming service requests towards a pool of backend servers. To further improve performance, multiple load balancers may be deployed to provide scalability and high availability for applications, websites and services hosted by backend servers.

DETAILED DESCRIPTION

According to examples of the present disclosure, service request distribution may be performed in an improved manner by assigning unequal path cost information to multiple load balancers capable of service request handling. For example, the unequal path cost information may be assigned based on a set of capability information that indicates varying capability levels among the load balancers. This should be contrasted against conventional approaches that perform service request distribution in a uniform manner. These conventional approaches may be sub-optimal and fault intolerant, especially when there is a performance degradation at particular load balancer. By considering real-time factor(s) affecting the capability level of each load balancer, examples of the present disclosure may be implemented to improve network resilience, fault tolerance and recovery of load balancers.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Figure 1:
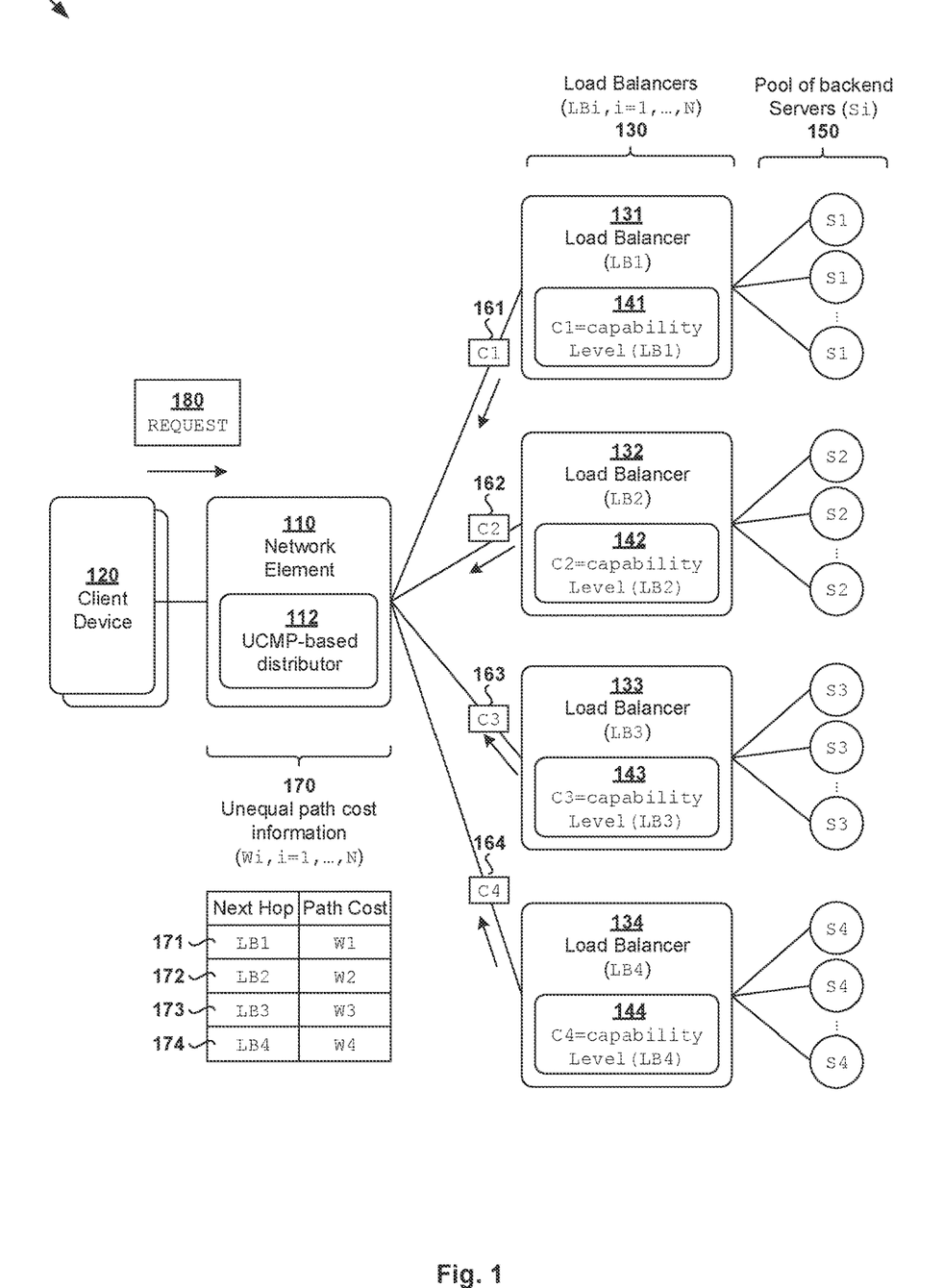
FIG. 1 is a schematic diagram illustrating an example network environment in which capability-aware service request distribution to load balancers may be performed.
Figure 2:
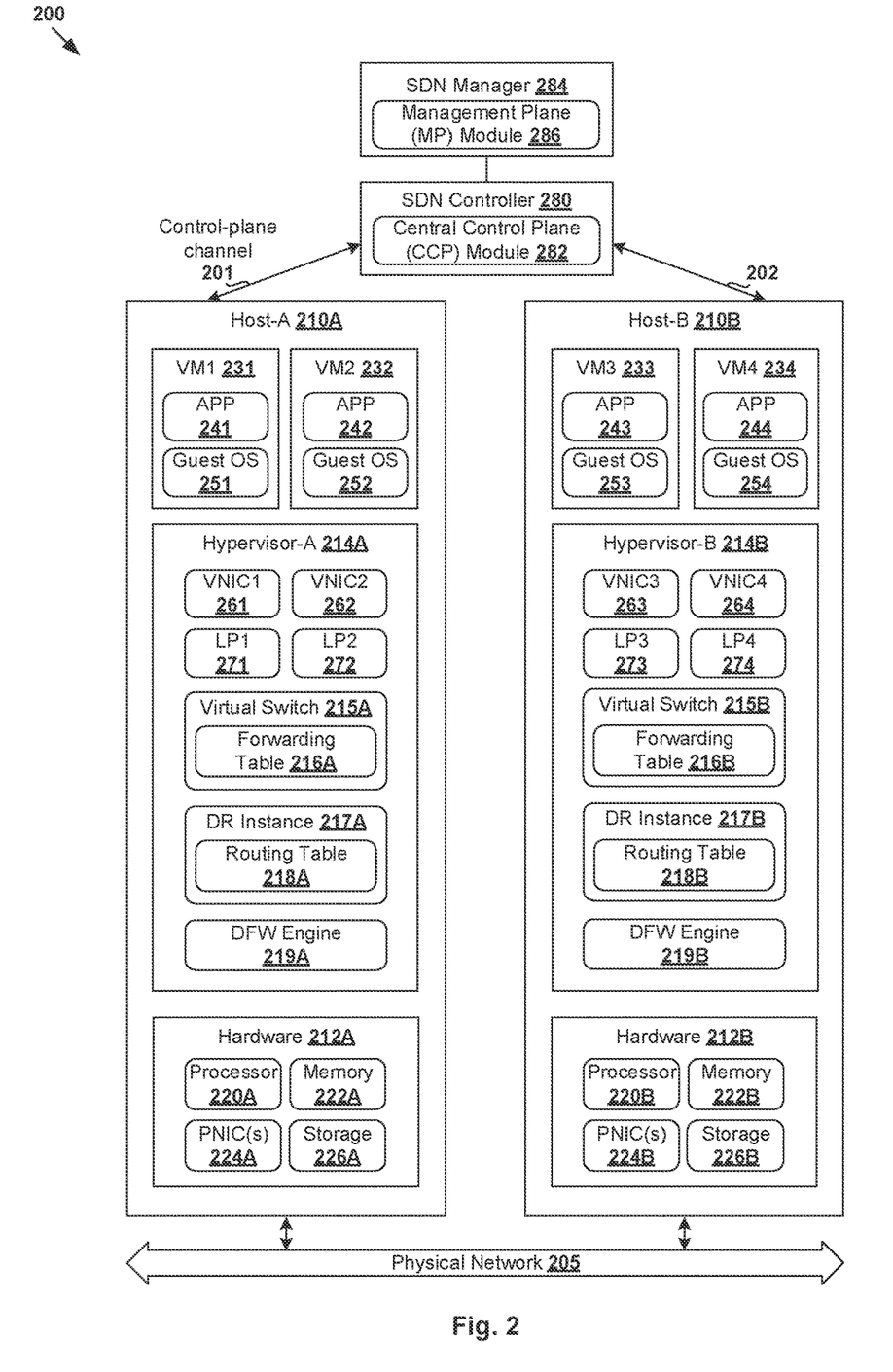
FIG. 2 is a schematic diagram illustrating an example physical view of hosts in the network environment in FIG. 1.

FIG. 1 is a schematic diagram illustrating example network environment 100 in which capability-aware service request distribution to load balancers may be performed. FIG. 2 is a schematic diagram illustrating example physical view 200 of hosts in network environment 100 in FIG. 1. It should be understood that, depending on the desired implementation, network environment 100 may include additional and/or alternative components than that shown in FIG. 1 and FIG. 2. In practice, network environment 100 may include any number of hosts (also known as "computer systems," "computing devices", "host computers", "host devices", "physical servers", "server systems", "transport nodes," etc.). Each host may be supporting any number of virtual machines (e.g., tens or hundreds).

In the example in FIG. 1, network environment 100 may include network element 110 (e.g., upstream router) that is configured to perform service request distribution to a cluster of multiple load balancers 130. In particular, in response to detecting an incoming service request from client device 120, network element 110 may steer the service request towards one of load balancers 130. Depending on the desired implementation, multiple next hops associated with the same Internet Protocol (IP) address (e.g., virtual IP address) assigned to load balancers 130 may be configured at network element 110. This way, any incoming service request for the virtual IP address may be steered towards one of the next hops (i.e., load balancers). In practice, network element 110 may be a physical router or a logical router.

Any suitable number (N) of load balancers denoted as LBi (i=1, . . . , N) may be deployed in any suitable redundancy configuration and/or scale-out deployment. For example, a cluster of size N=4 load balancers 131-134 (also known as "application load balancers" or "application delivery controllers") are configured to distribute traffic to server pool 150. In particular, in response to receiving an incoming service request from network element 110, each load balancer (LBi) is configured to steer the service request towards one of multiple backend servers (Si) 150 connected to that load balancer. Backend servers 150 (also known as application servers) may be configured to process incoming service requests using any suitable application(s), website(s) and hosted service(s) hosted by each server. Any suitable load balancing algorithm may be used by load balancers 130, such as round robin, hash function, etc. Load balancing helps in achieving optimal resource utilization, maximizing throughput, minimizing response time and reducing overload.

Depending on the desired implementation, a load balancer (LBi) may perform additional function(s) to further improve performance, such as secure sockets layer (SSL) termination, SSL acceleration, dynamic content caching, connection multiplexing, adaptive compression, enforcing quality of service (QoS) for application traffic, etc. In order to cater to high performance demands, load balancers 130 may be deployed for a service (or collection of services). Further, load balancers 130 may work with each other according to any suitable performance requirements, such as throughout, connections per second, transactions per second, packets per seconds, SSL termination, etc. This may be realized either as static appliances or an on-demand dynamic scale-out model.

In practice, load balancers 130 may be implemented using physical (bare metal) machines and/or virtual machines (VMs). Some example VMs 231-234 are shown in FIG. 2. Here, hosts 210A-B may reside in a software-defined networking (SDN) environment. Each host 210A/210B may include suitable hardware 212A/212B and virtualization software (e.g., hypervisor-A 214A, hypervisor-B 214B) to support VMs 231-234. For example, host-A 210A may support VM1 231 and VM2 232, while VM3 233 and VM4 234 are supported by host-B 210B. Hardware 212A/212B includes suitable physical components, such as central processing unit(s) (CPU(s)) or processor(s) 220A/220B; memory 222A/222B; physical network interface controllers (PNICs) 224A/224B; and storage disk(s) 226A/226B, etc.

Hypervisor 214A/214B maintains a mapping between underlying hardware 212A/212B and virtual resources allocated to respective VMs. Virtual resources are allocated to respective VMs 231-234 to support a guest operating system (OS; not shown for simplicity) and application(s); see 241-244, 251-254. For example, the virtual resources may include virtual CPU, guest physical memory, virtual disk, virtual network interface controller (VNIC), etc. Hardware resources may be emulated using virtual machine monitors (VMMs). For example in FIG. 2, VNICs 261-264 are virtual network adapters for VMs 231-234, respectively, and are emulated by corresponding VMMs (not shown) instantiated by their respective hypervisor at respective host-A 210A and host-B 210B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 214A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

SDN controller 280 and SDN manager 284 are example management entities in network environment 100. One example of an SDN controller is the NSX controller component of VMware NSX® (available from VMware, Inc.) that operates on a central control plane (see module 282). SDN controller 280 may be a member of a controller cluster (not shown for simplicity) that is configurable using SDN manager 284 (see module 286). Management entity 280/284 may be implemented using physical machine(s), VM(s), or both. To send or receive control information, a local control plane (LCP) agent (not shown) on host 210A/210B may interact with central control plane (CCP) module 282 at SDN controller 280 via control-plane channel 201/202.

Through virtualization of networking services in network environment 100, logical networks (also referred to as overlay networks or logical overlay networks) may be provisioned, changed, stored, deleted and restored programmatically without having to reconfigure the underlying physical hardware architecture. Hypervisor 214A/214B implements virtual switch 215A/215B and logical distributed router (DR) instance 217A/217B to handle egress packets from, and ingress packets to, corresponding VMs. In Network environment 100, logical switches and logical DRs may be implemented in a distributed manner and can span multiple hosts.

A logical switch may be implemented collectively by virtual switches 215A-B and represented internally using forwarding tables 216A-B at respective virtual switches 215A-B. Forwarding tables 216A-B may each include entries that collectively implement the respective logical switches. Further, logical DRs that provide logical layer-3 connectivity may be implemented collectively by DR instances 217A-B and represented internally using routing tables 218A-B at respective DR instances 217A-B. Routing tables 218A-B may each include entries that collectively implement the respective logical DRs (to be discussed further below).

Packets may be received from, or sent to, each VM via an associated logical port. For example, logical switch ports 271-274 are associated with respective VMs 231-234. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 215A-B in FIG. 2, whereas a "virtual switch" may refer generally to a software switch or software implementation of a physical switch. In practice, there is usually a one-to-one mapping between a logical port on a logical switch and a virtual port on virtual switch 215A/215B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Hosts 210A-B may also maintain data-plane connectivity with each other via physical network 205 to facilitate communication among VMs 231-234. Hypervisor 214A/214B may each implement virtual tunnel endpoint (VTEP)

to encapsulate and decapsulate packets with an outer header (also known as a tunnel header) identifying the relevant logical overlay network (e.g., VNI). Any suitable tunneling protocol, such as Virtual eXtensible Local Area Network (VXLAN), Generic Network Virtualization Encapsulation (GENEVE), etc. For example, VXLAN is a layer-2 overlay scheme on a layer-3 network that uses tunnel encapsulation to extend layer-2 segments across multiple hosts which may reside on different layer-2 physical networks.

To protect VMs 231-234 against potential security threats, hypervisor 214A/114B may implement distributed firewall (DFW) engine 219A/219B to filter packets to and from associated VMs 231-234. For example, at host-A 210A, hypervisor 214A implements DFW engine 219A to filter packets for VM1 231 and VM2 232. SDN controller 280 may be used to configure firewall rules that are enforceable by DFW engine 219A/119B. Packets may be filtered according to firewall rules at any point along the datapath from a source (e.g., VM1 231) to a physical NIC (e.g., 224A). In one embodiment, a filter component (not shown) may be incorporated into each VNIC 241-244 to enforce firewall rules configured for respective VMs 231-234. The filter components may be maintained by respective DFW engines 219A-B.

Capability-Aware Service Request Distribution

According to examples of the present disclosure, service request distribution among load balancers 130 may be implemented in an improved manner. In particular, network element 110 may dynamically assign (and adjust) a path cost (Wi) to each load balancer (LBi) based on capability information associated with load balancers 130. This should be contrasted against conventional approaches that distribute traffic uniformly based on equal-cost multipath routing (ECMP). By assigning unequal path cost information (Wi) to load balancers 130 based on their varying capability levels, unequal-cost multipath routing (UCMP) may be implemented to improve resilience, fault tolerance, recovery of load balancers 130. This also reduces the likelihood of overloading a particular load balancer (LBi) with a lower capability level to improve the overall system performance (e.g., measured in terms of resource utilization, throughput and response time).

As used herein, the term "unequal path cost information" may refer generally to a set of path costs {Wi} where it is not necessary for all path costs to be equal for all i=1, . . . , N. Here, at least one path cost (Wi) assigned to a load balancer (LBi) may be different to another path cost (Wk) allocated to at least one other load balancer (LBk) from cluster 130 using k≠i and i, k∈1, . . . , N. The term "capability information" may be any suitable information indicating the capability level (Ci) of a particular load balancer (LBi). As will be exemplified below, the "capability level" associated with a particular load balancer (LBi) may be defined using any suitable metric(s) or score(s) associated with hardware resource(s), software resource(s), network condition(s), health of backend servers 150, or any combination thereof.

Figure 3:
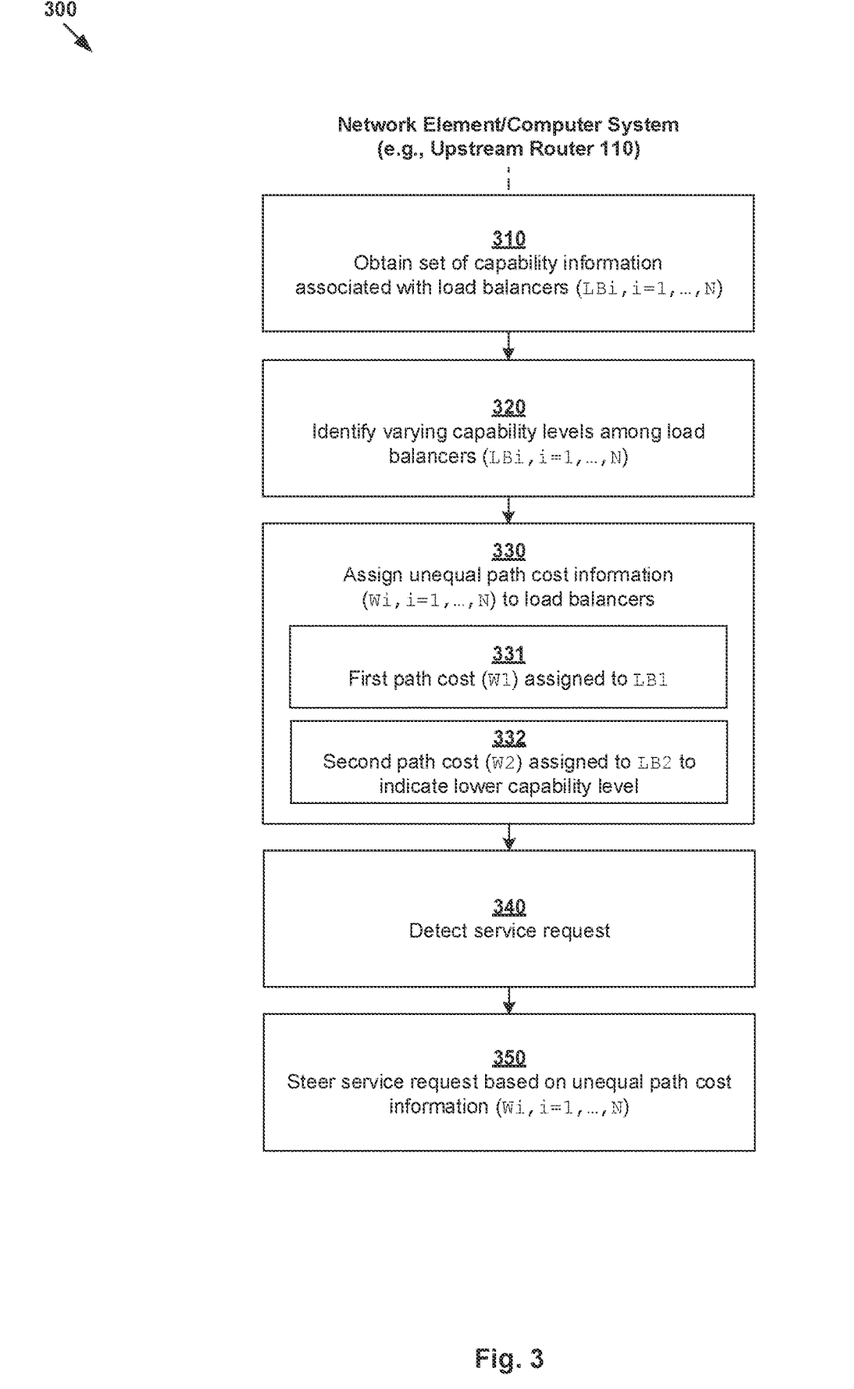
FIG. 3 is a flowchart of an example process for a network element to perform capability-aware service request distribution to load balancers.

In more detail, FIG. 3 is a flowchart of example process 300 for network element 110 to perform capability-aware service request distribution to load balancers in network environment 100. Example process 300 may include one or more operations, functions, or actions illustrated by one or more blocks, such as 310 to 350. The various blocks may be combined into fewer blocks, divided into additional blocks, and/or eliminated depending on the desired implementation. Examples of the present disclosure may be implemented using any suitable computer system supporting network element 110, which may be an upstream router that resides on a forwarding plane between client device(s) 120 and load balancers 130. In practice, network element 110 may be implemented be a bare-metal machine, logical network element (e.g., logical switch or logical router), etc. Network element 110 may implement examples of the present disclosure using any suitable software and/or hardware, such as UCMP-based service request distributor 112, etc.

At 310 in FIG. 3, network element 110 may obtain a set of capability information associated with multiple (N>1) load balancers 130. As will be discussed below, the set of capability information may be obtained using a routing information exchange approach (see FIG. 5) or a control-plane approach (see FIG. 6). The term "obtain" may refer generally to network element 110 retrieving or receiving the capability information from any suitable source(s), such as respective load balancers 131-134, a control-plane entity (e.g., SDN controller 280 and load balancer controller), a data store accessible by network element 110, etc.

At 320 in FIG. 3, network element 110 may identify varying capability levels (Ci, i=1, . . . , N) among load balancers 130 based on the set of capability information. For example, the set of capability information may include (a) first capability information identifying a first capability level (C1) associated with a first load balancer (LB1); and (b) second capability information identifying a second capability level (C2) associated with a second load balancer (LB2). The second load balancer (LB2) may be identified to have a lower capability level compared to the first load balancer (LB1) based on a comparison between C1 and C2. See 141-144 and 161-164 in FIG. 1.

At 330 in FIG. 3, network element 110 may assign unequal path cost information (Wi, i=1, . . . , N) to load balancers 130 to indicate the varying capability levels. For example, at 331-332, the unequal path cost information may include: (a) a first path cost (W1) assigned to first load balancer (LB1) 131; and (b) a second path cost (W2) assigned to second load balancer (LB2) 132. The second path cost may be different to the first path cost (i.e., W2≠W1) to indicate the lower capability level of LB2 132 compared to LB1 131. See 170-174 in FIG. 1.

At 340-350 in FIG. 3, in response to detecting a service request (see 180 in FIG. 1) that requires processing by a backend server (Si), network element 110 may steer the service request towards one of multiple load balancers 130 based on the unequal path cost information (Wi, i=1, . . . , N).

Depending on the desired implementation, the capability information (Ci) of a particular load balancer (LBi) may be associated with one or more of the following: hardware resources, software resources, backend servers (Si) and network condition(s). For example, the capability information associated with LBi may specify weighted combination of at least two of the following: (a) a health score indicating health of multiple backend servers; (b) a hardware score associated with static hardware resource configuration; (c) a network score indicating a network condition; (d) a resource score associated with dynamic resource allocation; (e) an application score associated with application resources; and (f) a software fault score indicating occurrence of a software fault.

Using examples of the present disclosure, UCMP may be performed based on unequal path cost information (Wi, i=1, . . . , N) to improve the overall performance of service request processing, such as by distributing fewer service requests to a load balancer with lower capability. The UCMP approach is more adaptive to changes in capability levels among load balancers 130 compared to ECMP, which assumes all load balancers 130 are the same regardless of their capability level. As will be discussed using FIG. 7, note that load balancers 130 may have a substantially similar hardware configuration based on an identical scale-out deployment strategy, or different hardware configurations based on a non-identical scale-out deployment strategy.

Routing Information Exchange Approach

According to a first example, network element 110 may obtain capability information associated with load balancers 130 using a routing information exchange approach. The first example will be explained using FIG. 4, which is a flowchart of detailed example process 400 of capability-aware service request distribution to load balancers. Example process 400 may include one or more operations, functions, or actions illustrated at 405 to 455. The various operations, functions or actions may be combined into fewer blocks, divided into additional blocks, and/or eliminated depending on the desired implementation. FIG. 5 is a schematic diagram illustrating first example 500 of capability-aware service request distribution to load balancers 130.

(a) Configuration

Figure 4:
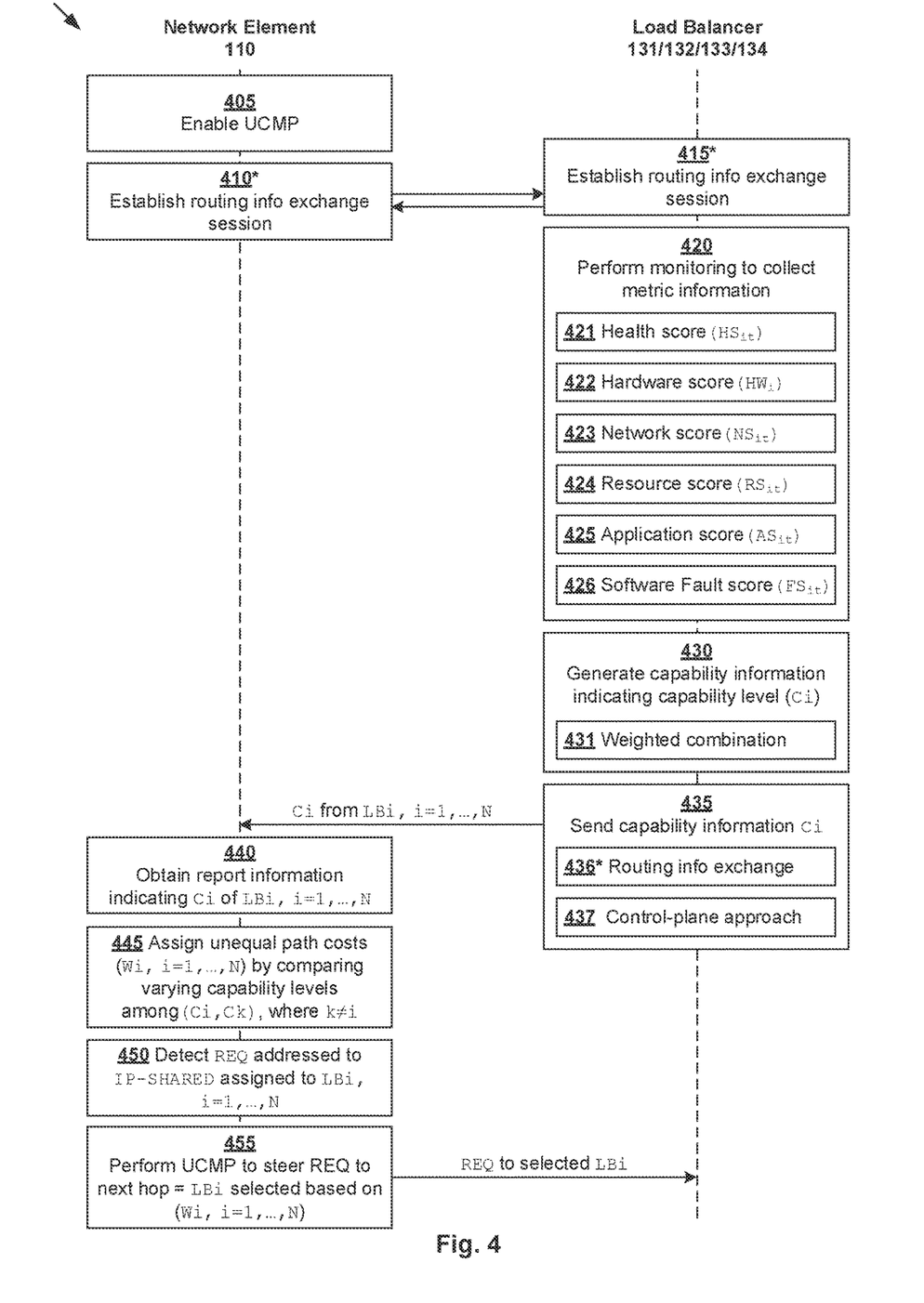
FIG. 4 is a flowchart of an example detailed process for capability-aware service request distribution to load balancers.
Figure 5:
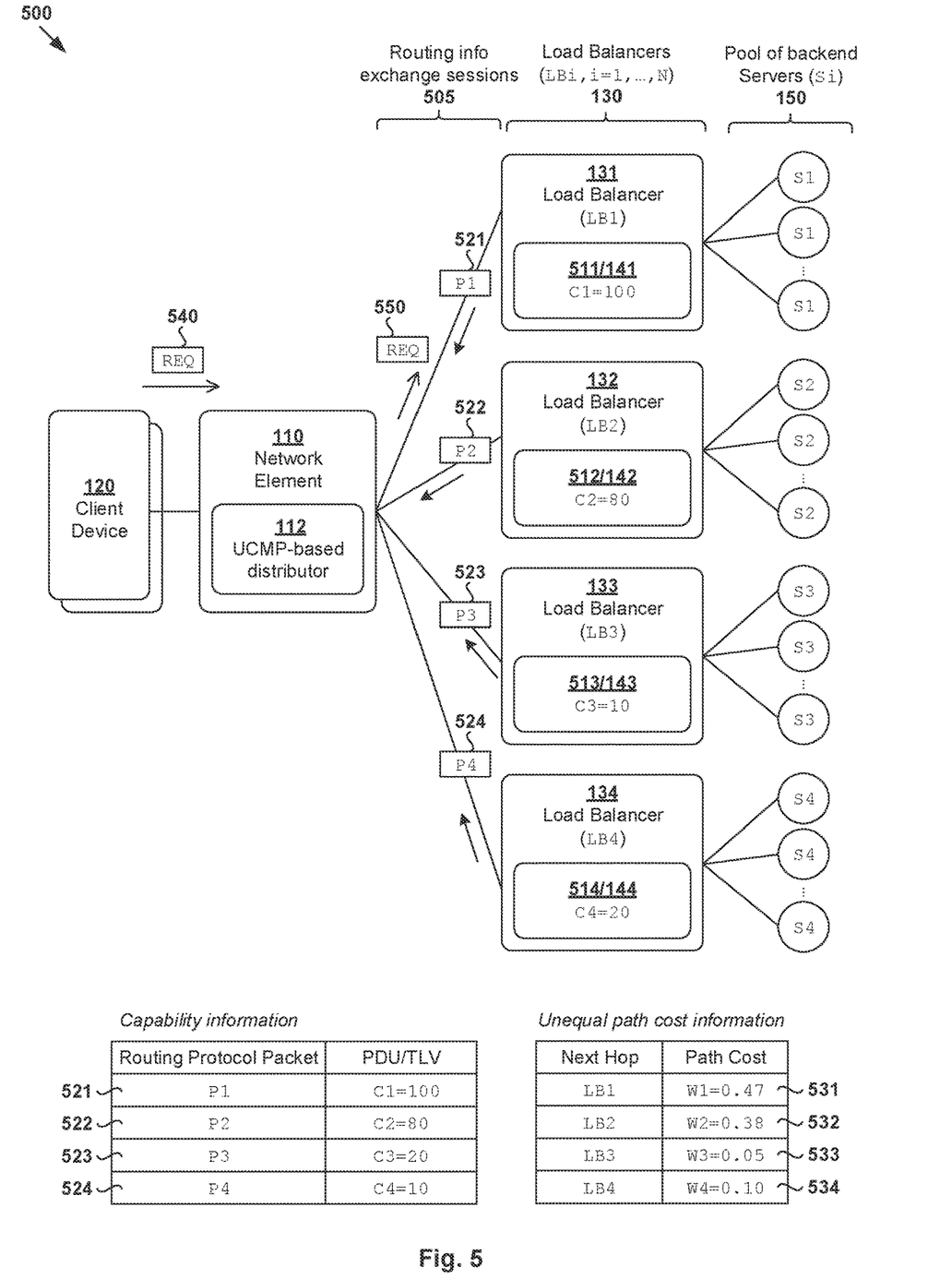
FIG. 5 is a schematic diagram illustrating a first example of capability-aware service request distribution to load balancers.

At 405 in FIG. 4, network element 110 may be configured to support UCMP, such as manually (e.g., by a network administrator) or programmatically. By enabling UCMP, network element 110 may assign unequal path cost information to a cluster of load balancers 130. This means that at least one path cost assigned to one load balancer (e.g., W1 for LB1) is different to another path cost (e.g., W2 for LB2). It is not necessary for all path costs to be different from each other.

At 410-415 in FIG. 4, load balancers 131-134 may each establish a routing information exchange session with network element 110 to exchange routing information. In the example in FIG. 5, load balancers 130 may be configured as part of a routing domain to peer with network element 110. In this case, network element 110 has multiple peers (i.e., next hops) for the same IP address (i.e., virtual IP address) associated with load balancers 130. Routing information exchange may be performed using any suitable routing protocol, such as border gateway protocol (BGP), intermediate system to intermediate system (IS-IS), open shortest path first (OSPF), routing information protocol (RIP), etc. See also 505 in FIG. 5.

(b) Capability Information

At 420 in FIG. 4, load balancers 131-134 may perform capability or health monitoring to collect metric information indicating with their respective capability levels (C1-C4). Depending on the desired implementation, the metric information may be static and/or dynamic (e.g., collected periodically at various time epochs). For example, the metric information for a particular load balancer (LBi) at a particular time (t) may include ($HS_{it}$, $HW_i$, $NS_{it}$, $RS_{it}$, $AS_{it}$, $FS_{it}$). Here, the health score ($HS_{it}$) indicates the health of backend servers 150 (see 421), hardware score ($HW_i$) is associated with static hardware resource configuration (see 422), network score ($NS_{it}$) is associated with network conditions (see 423), resource score ($RS_{it}$) associated with dynamic resource allocation (see 424), application score ($AS_{it}$) is associated with application resources (see 425) and software fault score ($FS_{it}$) indicates the detection (or non-detection of) software faults (see 426).

Note that ($HS_{it}$, $NS_{it}$, $RS_{it}$, $AS_{it}$, $FS_{it}$) may be monitored dynamically at various time epochs (t), while $HW_i$ may be static. In more detail, block 421 may involve determining the health score ($HS_{it}$) dynamically based on layer-4 metric information derived from TCP packets, such as roundtrip time (RTT), window size growth, zero window that halts data transmission, etc. Block 422 may involve determining the hardware score ($HW_i$) based on static (i.e., pre-configured) hardware configuration of LBi, such as compute resources (e.g., number of cores), installed memory, capacity of network interfaces, storage resources, etc. The state and utilization of auxiliary devices may be monitored, such as graphics processing unit (GPU), cryptography offload devices, remote direct memory access (RDMA) devices, etc. Depending on the desired implementation, the hardware score may be a dynamic score (e.g., $HW_{it}$ for time t) that may vary in real time. For example, in this case, hot pluggable devices (encompassing CPU, memory and network I/O) may be used to modify the hardware configuration in real time.

Block 423 may involve determining the network score ($NS_{it}$) associated with dynamic network conditions, such as quality metrics (e.g., latency, jitter and packet loss), capacity metrics (e.g., throughput, packets per second and limit on total TCP connections), large connection setup delays, total retransmissions, ingress and/or egress packet drops, packets per second (PPS), bits per second (BPS), requests per second (RPS), transactions per second (TPS), connections per second (CPS), etc. Block 424 may involve determining the resource score ($RS_{it}$) based on resources that are allocated dynamically. Depending on the desired implementation, an operating state of the load balancer (LBi) may be assessed, such as normal, degraded, upgrading, under maintenance, etc.

Block 425 may involve determining the application score ($AS_{it}$) by monitoring various application resources, such as port numbers, keys, nonce values, cookies, amount of connection memory, amount of memory for maintaining persistence state, backpressure from application-specific inter-process communication (IPC) rings, etc. Block 426 may involve determining the software fault score ($FS_{it}$) based on the detection (or non-detection of) software faults, such as assert indicators that indicate a compromise in software assumptions but do not crash the load balancer.

At 430 in FIG. 4, load balancers 131-134 may determine their respective capability levels (Ci) based on the metric information obtained at block 420. Depending on the desired implementation, the capability level (Ci) for a particular load balancer (LBi) at a particular time (t) may be calculated as a weighted combination of the metric information:

$$Ci(t)=k1*HS_{it}+k2*HW_i+k3*NS_{it}+k4*RS_{it}+k5*AS_{it}+k6*FS_{it}.$$

In the above example, weights (k1, k2, k3, k4, k5, k6) are assigned to respective scores ($HS_{it}$, $HW_i$, $NS_{it}$, $RS_{it}$, $AS_{it}$, $FS_{it}$) to indicate their importance. The scores may be normalized according to their respective maximum levels, such as $RS_{it}=1$ indicating a maximum level and $RS_{it}=0$ indicating a minimum level. Example weights may include (k1=10, k2=1, k3=10, k4=10, k5=10, k6=20), with the software fault score ($FS_{it}$) being the most important based on k6=20. In the example in FIG. 5, (C1=100, C2=80, C3=10, C4=20) may indicate that LB2 132, LB3 133 and LB4 134 each have a lower capability compared to LB1 131. See 511-514 in FIG. 5.

At 435-436 in FIG. 4, load balancers 131-134 may generate and send capability information indicating respective capability levels to network element 110. In the example in FIG. 5, the capability information may be sent using multiple routing protocol packets (e.g., BGP packets) using the routing information exchange session established at 410-415. See packets P1-P4 at 521-524. In practice, block 436 may include configuring a protocol definition unit (PDU) or type length value (TLV) field in the routing protocol packet to specify the capability level (Ci). Alternatively (see 437), a control-plane entity approach may be used (to be discussed using FIG. 6).

(c) Unequal Path Cost Assignment

At 440-445 in FIG. 4, in response to detecting capability information from load balancers 131-134, network element 110 may assign a path cost (Wi) to a path leading to a next hop=load balancer (LBi) based on its capability level (Ci). In one example, the path cost (Wi) assigned to a load balancer (LBi) may be proportional to its capability level (Ci) relative to that of other load balancers (LBj, j≠i):

$$Wi = Ci \bigg/ \sum_{j=1}^{N} Cj$$

In the example in FIG. 5, unequal path cost assignment may be performed based on (C1=100, C2=80, C3=10, C4=20), which indicates varying capability levels among load balancers 131-134. The varying capability levels may be identified by comparing C1=100 with C2=80, C3=10, C4=20, and so on. In this case, network element 110 may assign the following unequal path cost information: (W1=100/210=0.47, W2=80/210=0.38, W3=10/210=0.05, W4=20/210=0.10). This is because first load balancer 131 (i=1) has the highest capability level and third load balancer 133 (i=3) has the lowest capability level within the cluster. Path cost information may be stored in any suitable data structure, such as a table, etc. See 531-534 in FIG. 5.

At 450-455 in FIG. 4, in response to detecting a service request that is addressed to a virtual IP address (e.g., IP-SHARED) associated with load balancers 131-134, network element 110 may select one of load balancers 131-134 based on unequal path cost information (W1=0.47, W2=0.38, W3=0.05, W4=0.10). For example, the selected load balancer may be LB1 131. See 540-550 in FIG. 5.

Using UCMP, 47% of service requests will be steered towards LB1 131 based on W1=0.47, 38% towards LB2 132 based on W2=0.38, 5% towards LB3 133 based on W3=0.05 and the rest (10%) towards LB4 134 based on W4=0.10. The unequal path cost information may indicate the percentage (or proportion) of service request traffic each load balancer is capable of handling based on (C1=100, C2=80, C3=10, C4=20). This should be contrasted against conventional ECMP-based approach that relies on equal path cost information, such as (C1=25, C2=25, C3=25, C4=25) for uniform distribution of service requests.

Note that blocks 420-455 in FIG. 4 may be repeated periodically to facilitate adaptive UCMP-based service request distribution. This way, unequal path cost information (Wi, i=1, . . . , N) may be assigned and re-assigned dynamically in response to real-time capability levels (Ci, i=1, . . . , N) of load balancers 130. If a failure (e.g., software failure) is detected at a particular load balancer based on its capability information, service requests may be directed towards other functioning load balancers to reduce service disruption.

Control-Plane Approach

According to a second example, a control-plane approach may be performed for network element 110 to obtain capability information associated with load balancers 130. The second example will be explained using FIG. 6, which is a schematic diagram illustrating second example 600 of capability-aware service request distribution to load balancers. Similarly, network element 110 may perform block 405 in FIG. 4 to enable UCMP and load balancers 130 may perform blocks 420-430 to generate and send capability information. See 611-614 in FIG. 6.

Figure 6:
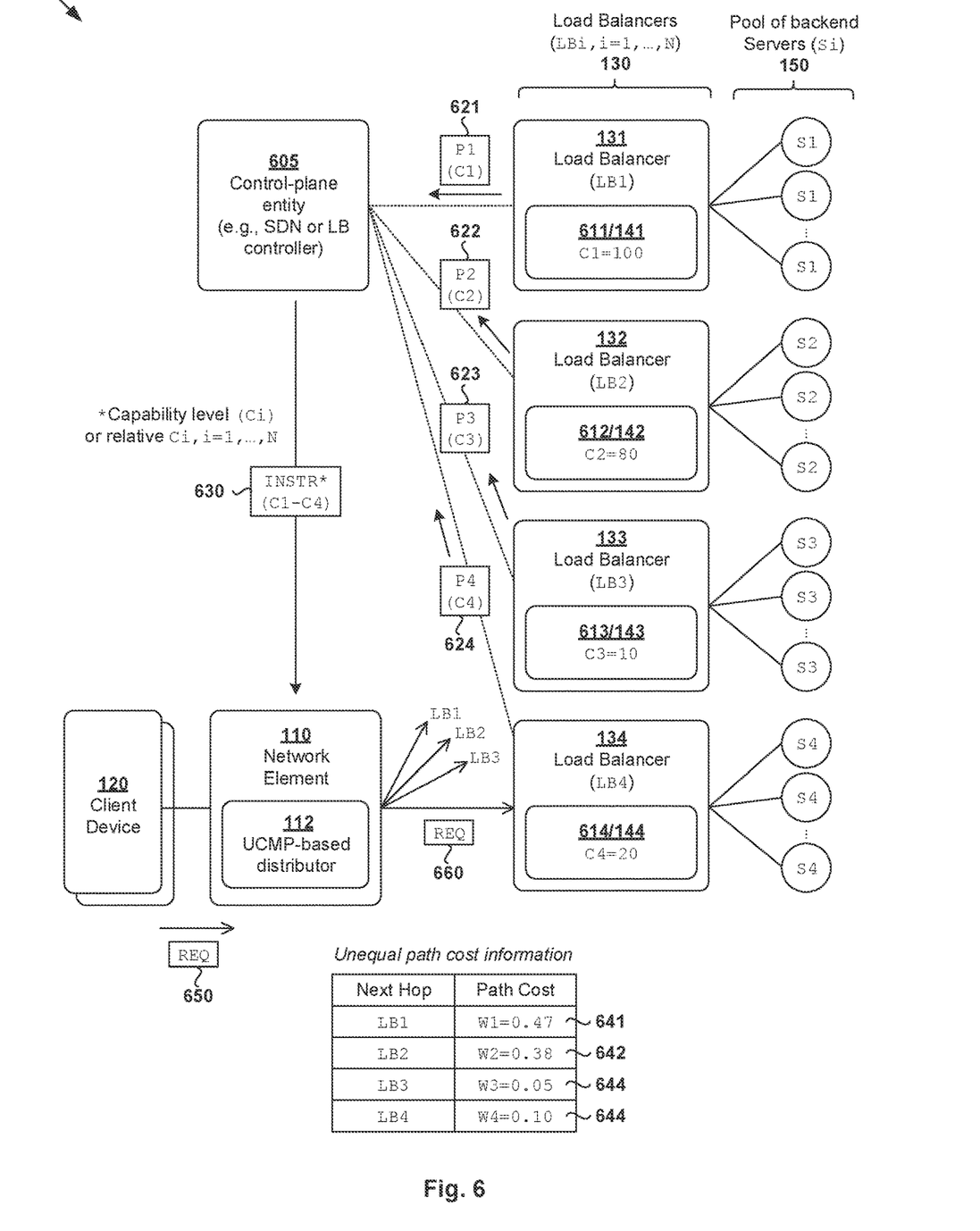
FIG. 6 is a schematic diagram illustrating a second example of capability-aware service request distribution to load balancers.

Unlike the routing information exchange approach in FIG. 5, the control-plane approach in FIG. 6 may involve load balancers 131-134 may generating and sending capability information to network element 110 via a control-plane entity (see 605). See 621-624 in FIG. 6 where packets P1-P4 may be configured to report respective capability levels C1-C4 to control-plane entity 605. In this case, block 440 in FIG. 4 may involve network element 110 receiving or retrieving the capability information (or a variation thereof) from control-plane entity 605. See also 630 in FIG. 6.

In a first example, load balancers 131-134 may send the capability information to SDN controller 280 for subsequent transmission to network element 110. In a second example, the capability information may be sent to a load balancer controller (not shown) for subsequent transmission to network element 110. In a third example, the capability information may be sent to the load balancer controller for subsequent transmission to SDN controller 280 and then network element 110. Further, if enabled with the relevant communications protocol (see below), load balancers 131-134 may be configured to send the capability information directly (not shown) to network element 110.

In the example in FIG. 6, network element 110 may be an SDN-capable entity that is stateful in nature, such as a logical switch or logical entity that is configurable using control-plane entity 605. Control-plane entity 605 residing on a control plane may interact with SDN-capable network element 110 on a forwarding plane using any suitable "communications protocol" to influence unequal path cost information assignment, such as OpenFlow™ (a trademark of the Open Networking Foundation) that defines standard interfaces for both north-bound and south-bound definitions to program SDN-capable devices, etc. If a load balancer controller is configured to communicate with SDN-capable network element 110 directly, the load balancer controller may either function as the SDN controller itself or interface with a standard SDN controller. Any suitable standard interfaces and protocol definitions may be used.

Depending on the desired implementation, control-plane entity 605 may influence unequal path cost assignment by sending network element 110 the capability information (see 621-624) received from load balancers 131-134, or a variation thereof. Any suitable variation(s) may be introduced, such as modifying the original capability information (see 621-624) to indicate relative capability levels, etc. Further, any suitable algorithm (e.g., linear solvers) may be used to minimize error(s) when calculating the relative capability levels.

In practice, the routing information exchange approach in FIG. 5 or the control-plane approach in FIG. 6 may be performed according to the desired implementation. Since control-plane entity 605 has visibility of all capability information from load balancers 131-134, a more accurate relative path cost may be calculated for each load balancer. This way, control-plane entity 605 may influence unequal path cost assignment dynamically based on any suitable criteria or criterion, such as to minimize the net connection failure rate, etc.

The routing information exchange approach in FIG. 5 may be implemented in cases where it is desirable to operate load balancers 131-134 using a "headless" mode (i.e., without a controller). In this case, the dependency on control-plane entity 605 may be removed, such as to reduce computational and network overhead associated with each load balancer sending capability information to a central controller. Further, path cost assignment at network element 110 may be disrupted when the reachability of control-plane entity 605 from load balancers 131-134 is not guaranteed.

Third Example: Non-Identical Scale-Out Deployment

According to examples of the present disclosure, unequal path cost information may be assigned to a load balancer cluster configured with (a) a substantially similar hardware configuration or (b) different hardware configurations. In the examples in FIGS. 5-6, a management entity (e.g., SDN controller 280 or SDN manager 284) may deploy identical load balancers 131-134 according to an identical scale-out deployment strategy. The hardware configuration may be defined in terms of compute resources (e.g., 32 CPU cores), memory resources (e.g., 64 GB memory), network resources, storage resources (e.g., size of solid-state drive (SSD)), etc.

Alternatively, a non-identical scale-out deployment strategy may be used to deploy non-identical load balancers. An example will be explained using FIG. 7, which is a schematic diagram illustrating third example 700 of capability-aware service request distribution to load balancers. At 710 in FIG. 7, first load balancer (LB1) 131 may be deployed with 32 CPU cores, 128 GB memory and 128 GB SSD, etc. Here, LB1 131 may be deployed to support several applications denoted as APP1-APP4 (see 701-704) that have their own resource demands or performance requirements.

Figure 7:
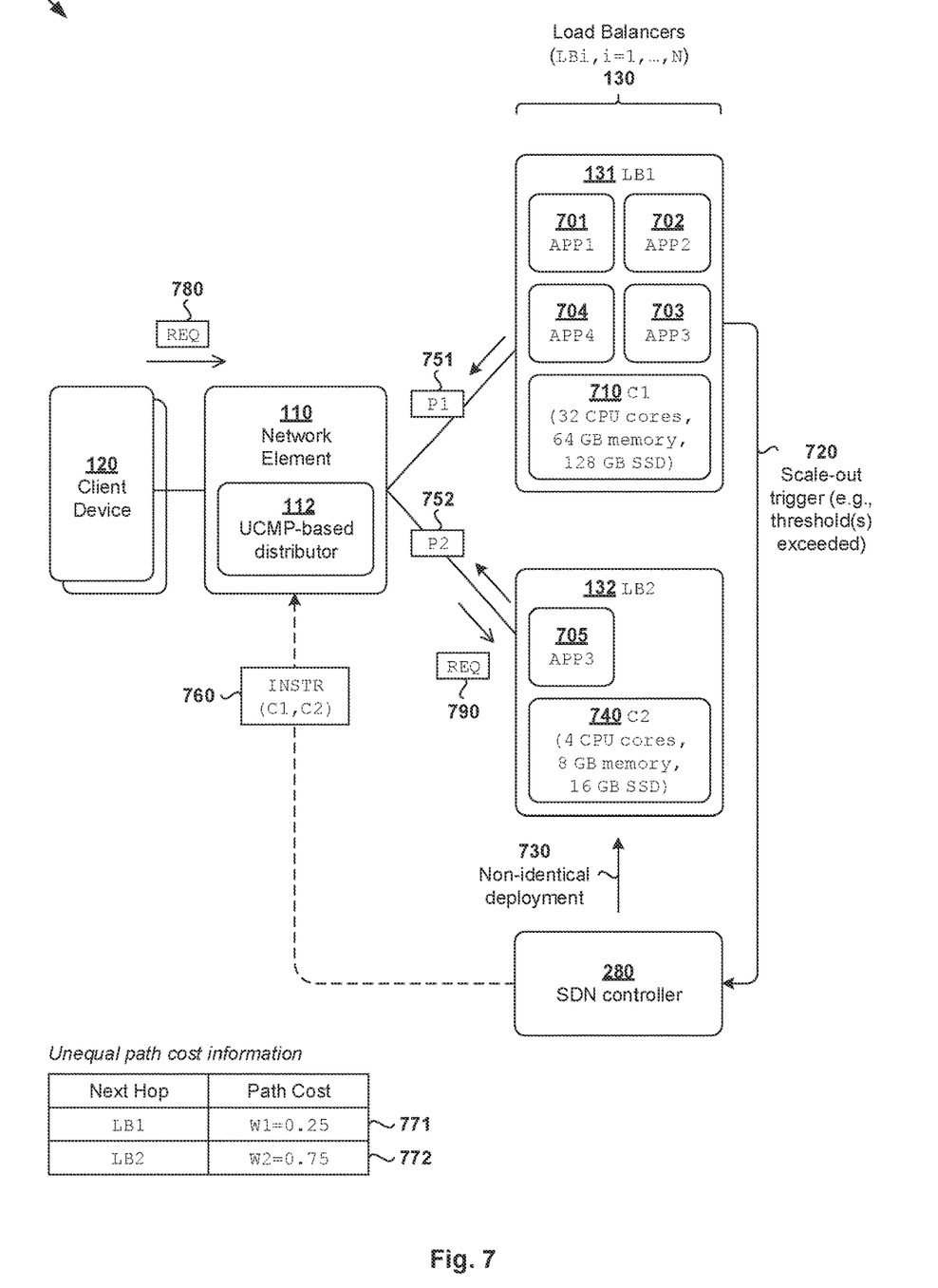
FIG. 7 is a schematic diagram illustrating a third example of capability-aware service request distribution to load balancers.

At 720 in FIG. 7, SDN controller 280 may detect a scale-out trigger from LB1 131. Depending on the desired implementation, scale-out trigger 720 may be detected based on resource consumption (e.g., CPU utilization, memory utilization, network utilization, storage utilization, etc.) and/or real-time metric information (e.g., BPS, PPS, RPS, TTS, CPS, etc.). Using a throughput-based example in FIG. 7, LB1 131 may have a total capacity of 10 Gbps. At a particular time (t), the scale-out trigger may be detected when the throughput is detected to be greater than 8 Gbps, such as 1 Gbps for APP1 701, 2 Gbps for APP2 702, 4.5 Gbps for APP3 703 and 1 Gbps for APP4 704 (i.e., total=8.5 Gbps).

At 730-740 in FIG. 7, SDN controller 280 may deploy second load balancer (LB2) 132 according to a non-identical scale-out deployment strategy. In particular, LB2 132 may be configured with a different hardware configuration (e.g., C1=4 CPU cores, 8 GB memory and 16 GB SSD) compared to LB1 131 (e.g., C2=32 CPU cores, 128 GB memory and 128 GB SSD). In other words, LB2 132 is a smaller load balancer instance compared to LB1 131 for supporting another instance of APP3 (see 705). Both load balancers 131-132 are non-identical in terms of hardware capability.

Next, network element 110 may perform unequal path cost assignment according to the examples in FIGS. 4-6. Using a routing information exchange approach (see 751-752), network element 110 may obtain capability information identifying the non-identical hardware configurations from respective load balancers 131-132. Alternatively, using a control-plane approach (see 760), network element 110 residing on the forwarding plane may interact with SDN controller 280 on the control plane to obtain the capability information. The resulting unequal path cost information (see 771-772) may include (W1=0.25, W2=0.75) for APP3 703/705 running on both LB1 131 and LB2 132. This way, during service request distribution, network element 110 may steer a service request towards LB1 131 or LB2 132 based on the unequal path cost information. See 780-790.

In the example in FIG. 7, additional capacity provided by LB2 132 may be used to reduce the likelihood of an overload at LB1 131. For example, 75% of the traffic for APP3 703/705 may be steered towards new instance LB2 132. The released capacity from LB1 131 may be reclaimed for other applications APP1 701, APP2 702 and APP4 704. This improves the ability of LB1 131 to handle momentary bursts or spikes. Various implementation details that have been discussed using FIGS. 4-6 are applicable here and not repeated for brevity. Note that the non-identical scale-out deployment strategy based on scale-out trigger(s) may be used together UCMP (shown in FIG. 7) or ECMP (not shown).

In practice, the non-identical scale-out deployment strategy may be implemented to improve the efficiency, flexibility and performance of scale-out operations. Instead of necessitating the deployment of identical (i.e., uniform) load balancers, SDN controller 280 may make more intelligent and efficient scale-out decisions. Also, the combination of the non-identical scale-out deployment strategy by SDN controller 280 and UCMP by network element 110 may improve performance, such as in terms of the ability to handle traffic bursts or spikes. By having the flexibility to deploy smaller load balancer instances, power consumption, carbon footprint and operational cost may be reduced. Scale-in deployment may be implemented in a similar manner based on scale-in trigger(s) from LB1 131 and/or LB2 132.

Container Implementation

Although explained using VMs, it should be understood that network environment 100 may include other virtual workloads, such as containers, etc. Here, the term "container" or "container instance" is used generally to describe an application that is encapsulated with all its dependencies (e.g., binaries, libraries, etc.). In FIG. 2, container technologies may be used to run various containers inside respective VMs 231-234. Containers are "OS-less", meaning that they do not include any OS that could weigh 10s of Gigabytes (GB). This makes containers more lightweight, portable, efficient and suitable for delivery into an isolated OS environment. Running containers inside a VM (known as "containers-on-VM" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. Examples of the present disclosure may be implemented by any suitable "network element" 110 (e.g., upstream router). Network element 110 may include a "first network interface" to interact with client device 120 and multiple (N) "second network interfaces" to interact with respective load balancers 130; see examples in FIGS. 1, 5-7. The term "interact" may refer generally to any suitable communication to send or receive information. The first/second network interfaces may be virtual or physical network interfaces. Network element 110 may further include service request distributor 112 enabled with UCMP to perform process(es) described herein with reference to FIGS. 1-7.

Any suitable "computer system" may be used to implement network element 110. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described with reference to FIGS. 1-7.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method for a network element to perform capability-aware service request distribution, wherein the method comprises:
  obtaining, by the network element, a set of capability information associated with multiple load balancers capable of service request handling, wherein the set of capability information includes first capability information associated with a first load balancer and second capability information associated with a second load balancer;
  based on the set of capability information, identifying, by the network element, varying capability levels among the multiple load balancers, wherein the second load balancer identified to have a lower capability level compared to the first load balancer; and
  assigning, by the network element, unequal path cost information to the multiple load balancers to indicate the varying capability levels, wherein the unequal path cost information includes:
   (a) a first path cost that is assigned to the first load balancer; and
   (b) a second path cost that is assigned to the second load balancer and different to the first path cost to indicate the lower capability level of the second load balancer compared to the first load balancer; and
  in response to detecting a service request, steering, by the network element, the service request towards one of the multiple load balancers based on the unequal path cost information, wherein each of the multiple load balancers corresponds to a next hop of the network element.

2. The method of claim 1, wherein identifying the varying capability levels comprises:
  comparing the first capability information with the second capability information to identify the lower capability level of the second load balancer, wherein the first capability information or the second capability information is associated with one or more of the following: hardware resources, software resources, backend servers and network condition.

3. The method of claim 2, wherein identifying the varying capability levels comprises:
  comparing the first capability information with the second capability information to identify the lower capability level of the second load balancer, wherein the first capability information and the second capability information specifies a weighted combination of at least two of the following: (a) a health score indicating health of multiple backend servers; (b) a hardware score associated with static hardware resource configuration; (c) a network score indicating a network condition; (d) a resource score associated with dynamic resource allocation; (e) an application score associated with application resources; and (f) a software fault score indicating occurrence of a software fault.

4. The method of claim 1, wherein obtaining the set of capability information comprises:
  obtaining the set of capability information in the form of multiple packets from the respective multiple load balancers, wherein the multiple packets are associated with a routing protocol to exchange routing information with the network element as well as to influence the unequal path cost information assignment by the network element.

5. The method of claim 1, wherein obtaining the set of capability information comprises:
  obtaining the set of capability information from a control-plane entity capable of using a communications protocol to interact with the network element residing on a forwarding plane to influence the unequal path cost information assignment by the network element.

6. The method of claim 1, wherein assigning the unequal path cost information comprises:
  assigning the unequal path cost information to the multiple load balancers that are configured with a substantially similar hardware configuration based on an identical scale-out deployment strategy by a management entity capable of deploying the multiple load balancers.

7. The method of claim 1, wherein assigning the unequal path cost information comprises:
assigning the unequal path cost information to the multiple load balancers that are configured with different hardware configurations based on a non-identical scale-out deployment strategy by a management entity capable of deploying the multiple load balancers.

8. A non-transitory computer-readable storage medium that includes a set of instructions which, in response to execution by a processor of a network element, cause the processor to perform capability-aware service request distribution, wherein the method comprises:
obtaining, by the network element, a set of capability information associated with multiple load balancers capable of service request handling, wherein the set of capability information includes first capability information associated with a first load balancer and second capability information associated with a second load balancer;
based on the set of capability information, identifying, by the network element, varying capability levels among the multiple load balancers, wherein the second load balancer identified to have a lower capability level compared to the first load balancer; and
assigning, by the network element, unequal path cost information to the multiple load balancers to indicate the varying capability levels, wherein the unequal path cost information includes:
(a) a first path cost that is assigned to the first load balancer; and
(b) a second path cost that is assigned to the second load balancer and different to the first path cost to indicate the lower capability level of the second load balancer compared to the first load balancer; and
in response to detecting a service request, steering, by the network element, the service request towards one of the multiple load balancers based on the unequal path cost information, wherein each of the multiple load balancers corresponds to a next hop of the network element.

9. The non-transitory computer-readable storage medium of claim 8, wherein identifying the varying capability levels comprises:
comparing the first capability information with the second capability information to identify the lower capability level of the second load balancer, wherein the first capability information or the second capability information is associated with one or more of the following: hardware resources, software resources, backend servers and network condition.

10. The non-transitory computer-readable storage medium of claim 9, wherein identifying the varying capability levels comprises:
comparing the first capability information with the second capability information to identify the lower capability level of the second load balancer, wherein the first capability information or the second capability information specifies a weighted combination of at least two of the following: (a) a health score indicating health of multiple backend servers; (b) a hardware score associated with static hardware resource configuration; (c) a network score indicating a network condition; (d) a resource score associated with dynamic resource allocation; (e) an application score associated with application resources; and (f) a software fault score indicating occurrence of a software fault.

11. The non-transitory computer-readable storage medium of claim 8, wherein obtaining the set of capability information comprises:
obtaining the set of capability information in the form of multiple packets from the respective multiple load balancers, wherein the multiple packets are associated with a routing protocol to exchange routing information with the network element as well as to influence the unequal path cost information assignment by the network element.

12. The non-transitory computer-readable storage medium of claim 8, wherein obtaining the set of capability information comprises:
obtaining the set of capability information from a control-plane entity capable of using a communications protocol to interact with the network element residing on a forwarding plane to influence the unequal path cost information assignment by the network element.

13. The non-transitory computer-readable storage medium of claim 8, wherein assigning the unequal path cost information comprises:
assigning the unequal path cost information to the multiple load balancers that are configured with a substantially similar hardware configuration based on an identical scale-out deployment strategy by a management entity capable of deploying the multiple load balancers.

14. The non-transitory computer-readable storage medium of claim 8, wherein assigning the unequal path cost information comprises:
assigning the unequal path cost information to the multiple load balancers that are configured with different hardware configurations based on a non-identical scale-out deployment strategy by a management entity capable of deploying the multiple load balancers.

15. A router, comprising:
a first network interface to interact with a client device;
multiple second network interfaces to interact with respective multiple load balancers; and a service request distributor configured to:
obtain, by the router, a set of capability information associated with multiple load balancers capable of service request handling, wherein the set of capability information includes first capability information associated with a first load balancer and second capability information associated with a second load balancer;
based on the set of capability information, identify, by the router, varying capability levels among the multiple load balancers, wherein the second load balancer identified to have a lower capability level compared to the first load balancer; and
assign, by the router, unequal path cost information to the multiple load balancers to indicate the varying capability levels, wherein the unequal path cost information includes: (a) a first path cost that is assigned to the first load balancer; and (b) a second path cost that is assigned to the second load balancer and different to the first path cost to indicate the lower capability level of the second load balancer compared to the first load balancer; and
in response to detecting a service request via the first network interface, steer, by the router, the service request towards one of the multiple load balancers based on the unequal path cost information via one of the multiple second network interfaces, wherein each of the multiple load balancers corresponds to a next hop of the router.

16. The router of claim 15, wherein the service request distributor is configured to identify the varying capability levels by:
comparing the first capability information with the second capability information to identify the lower capability level of the second load balancer, wherein the first capability information or the second capability information is associated with one or more of the following: hardware resources, software resources, backend servers and network condition.

17. The router of claim 16, wherein the service request distributor is configured to identify the varying capability levels by:
comparing the first capability information with the second capability information to identify the lower capability level of the second load balancer, the first capability information or the second capability information specifying a weighted combination of at least two of the following: (a) a health score indicating health of multiple backend servers; (b) a hardware score associated with static hardware resource configuration; (c) a network score indicating a network condition; (d) a resource score associated with dynamic resource allocation; (e) an application score associated with application resources; and (f) a software fault score indicating occurrence of a software fault.

18. The router of claim 15, wherein the service request distributor is configured to obtain the set of capability information by:
obtaining the set of capability information in the form of multiple packets from the respective multiple load balancers, wherein the multiple packets are generated according to a routing protocol to exchange routing information with the router as well as to influence the unequal path cost information assignment by the router.

19. The router of claim 15, wherein the service request distributor is configured to obtain the set of capability information by:
obtaining the set of capability information from a control-plane entity capable of using a communications protocol to interact with the router residing on a forwarding plane to influence the unequal path cost information assignment by the router.

20. The router of claim 15, wherein the service request distributor is configured to assign the unequal path cost information by:
assigning the unequal path cost information to the multiple load balancers that are configured with a substantially similar hardware configuration based on an identical scale-out deployment strategy by a management entity capable of deploying the multiple load balancers.

21. The router of claim 15, wherein the service request distributor is configured to assign the unequal path cost information by:
assigning the unequal path cost information to the multiple load balancers that are configured with different hardware configurations based on a non-identical scale-out deployment strategy by a management entity capable of deploying the multiple load balancers.

* * * * *